(12) United States Patent
McCrea et al.

(10) Patent No.: US 7,241,962 B1
(45) Date of Patent: Jul. 10, 2007

(54) ELECTRICAL DISCHARGE TEXTURING MACHINE

(75) Inventors: Keith A. McCrea, Yorkville, OH (US); Craig A. Noble, Georgetown, PA (US)

(73) Assignee: Court Holdings Limited, Beamsville, Ontario (CA)

( * ) Notice: Subject to any disclaimer, the term of this patent is extended or adjusted under 35 U.S.C. 154(b) by 0 days.

(21) Appl. No.: 11/415,903

(22) Filed: May 2, 2006

(51) Int. Cl.
 *B23H 7/26* (2006.01)
 *B23H 1/04* (2006.01)

(52) U.S. Cl. .................................. 219/69.2; 219/69.15
(58) Field of Classification Search ............. 219/69.15, 219/69.2, 69.14, 69.16, 69.17
See application file for complete search history.

(56) References Cited

U.S. PATENT DOCUMENTS

| | | | | |
|---|---|---|---|---|
| 4,233,485 A | * | 11/1980 | Sato et al. | 219/69.17 |
| 4,242,557 A | * | 12/1980 | Sato et al. | 219/69.15 |
| 4,484,053 A | * | 11/1984 | Michishita et al. | 219/69.15 |
| 4,683,364 A | * | 7/1987 | Anderson | 219/69.1 |
| 4,755,651 A | * | 7/1988 | Tsutsui et al. | 219/69.14 |
| 4,870,243 A | * | 9/1989 | Wilson et al. | 219/69.14 |
| 5,034,589 A | * | 7/1991 | Evans et al. | 219/69.15 |
| 6,084,194 A | * | 7/2000 | Baker | 219/69.17 |
| 6,124,562 A | * | 9/2000 | Baker et al. | 219/69.14 |
| 6,165,422 A | | 12/2000 | Baker et al. | |
| 6,259,053 B1 | | 7/2001 | Baker | |

FOREIGN PATENT DOCUMENTS

| | | |
|---|---|---|
| CS | 216259 | 12/1981 |
| CS | 216260 | 12/1981 |
| CS | 239354 | 3/1983 |
| CS | 241345 | 7/1985 |
| CS | 242197 | 7/1985 |
| EP | 370707 A1 * | 5/1990 |
| GB | 2222108 A * | 2/1990 |

* cited by examiner

*Primary Examiner*—Geoffrey S. Evans
(74) *Attorney, Agent, or Firm*—Norris, McLaughlin & Marcus

(57) ABSTRACT

A low cost electrical discharge texturing machine which can texture work rolls having a broad range of diameters and lengths either on a production or research and development basis. The machine is relatively portable, for example, it can be mounted on a palate, and can be used at any location having an adequate electrical supply. Electrodes are mounted on the machine in a manner which maximizes flexibility in respect of the roll diameters that can be textured. The machine also has adjustable supports for the work rolls which can raise or lower a roll surface relative to the electrodes to provide additional flexibility in the roll dimensions that can be textured. Furthermore, the machine has programmable x-axis drives and these can optionally be used in combination with programmable roll drives.

15 Claims, 9 Drawing Sheets

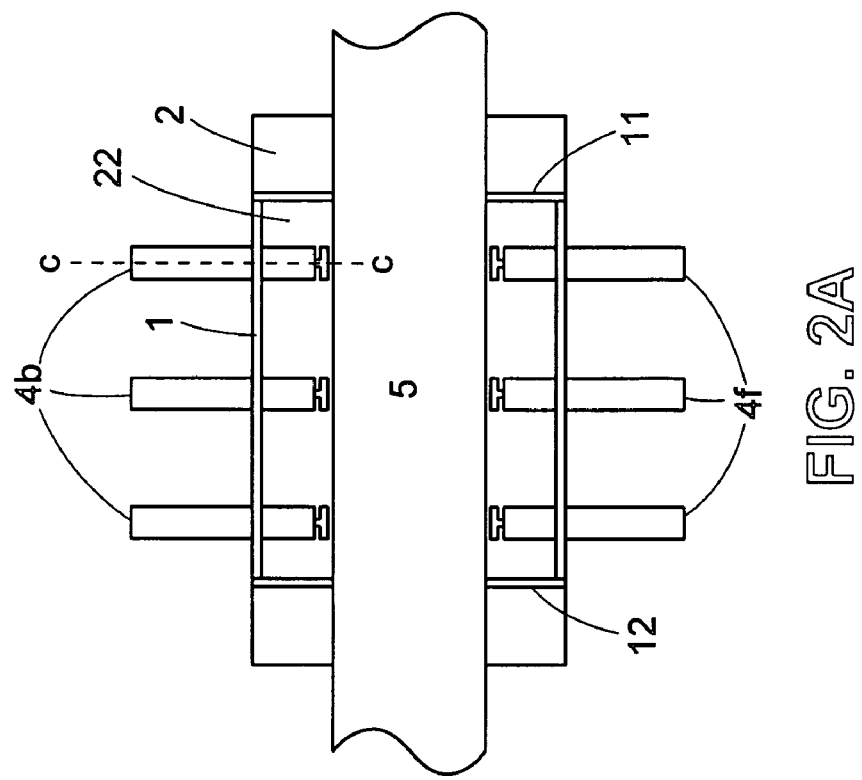
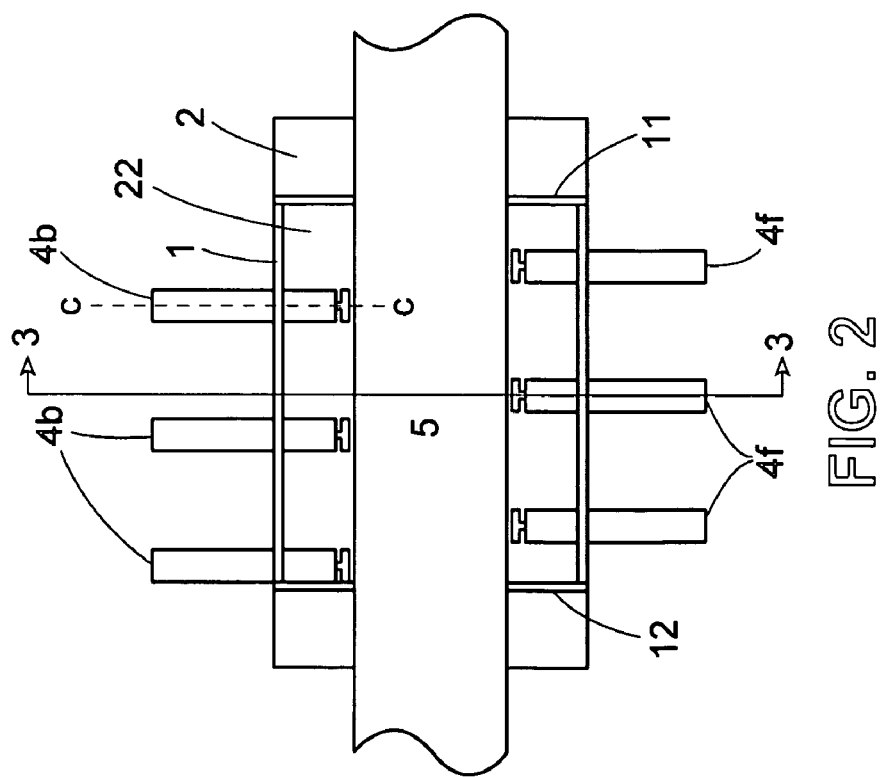
FIG. 2A
FIG. 2

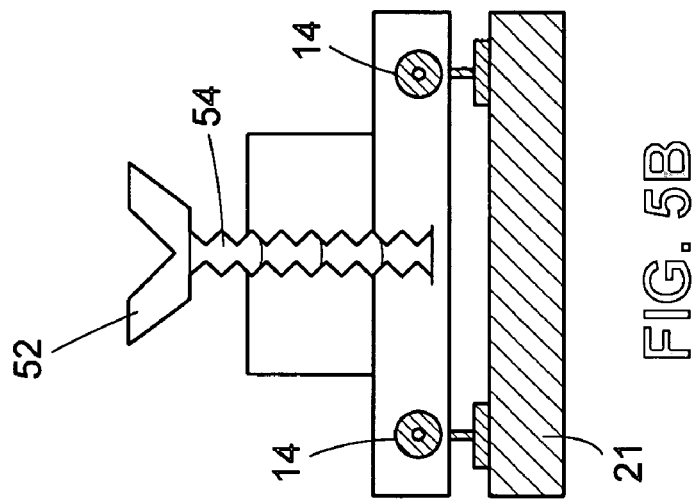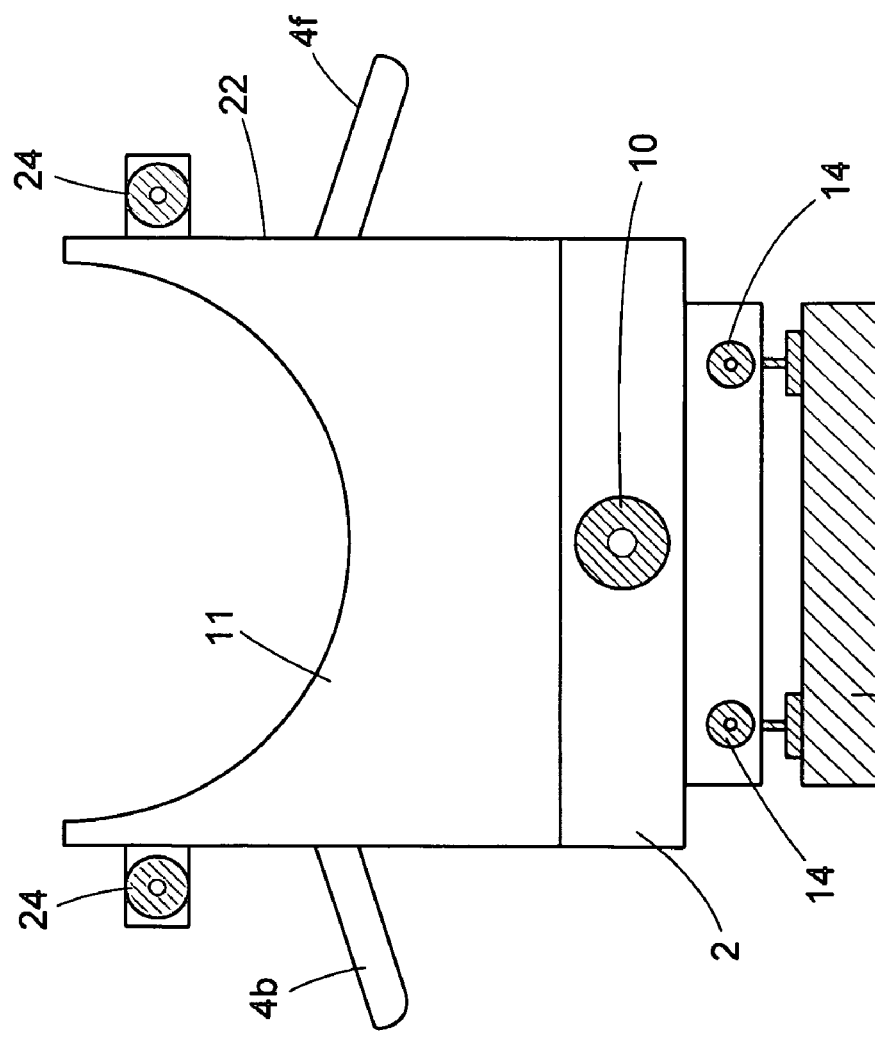

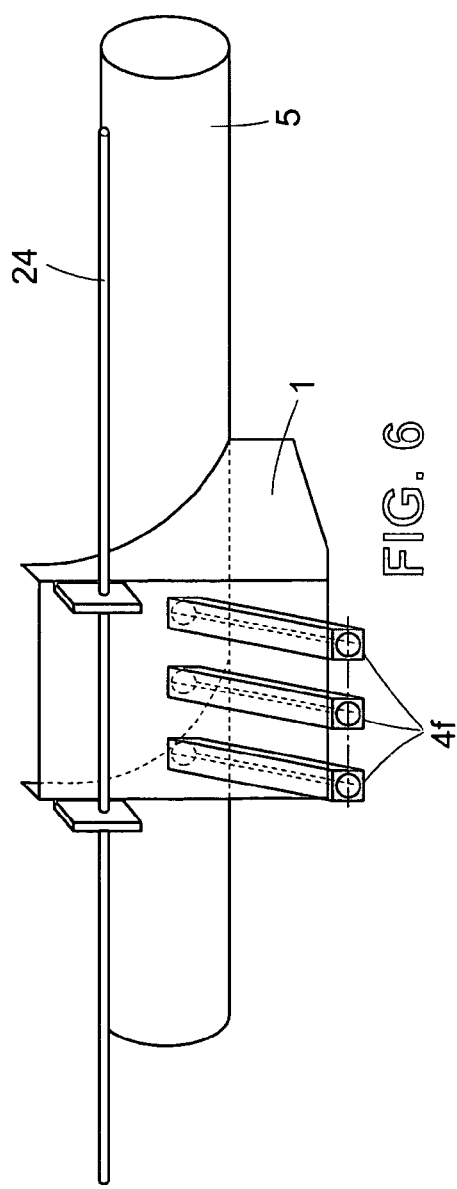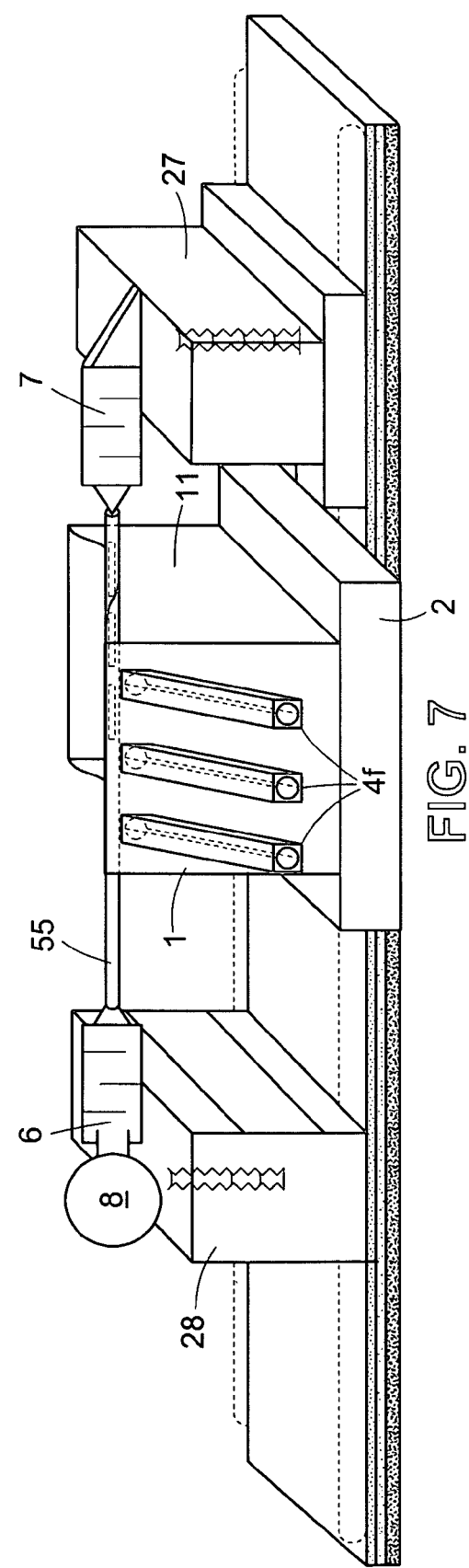

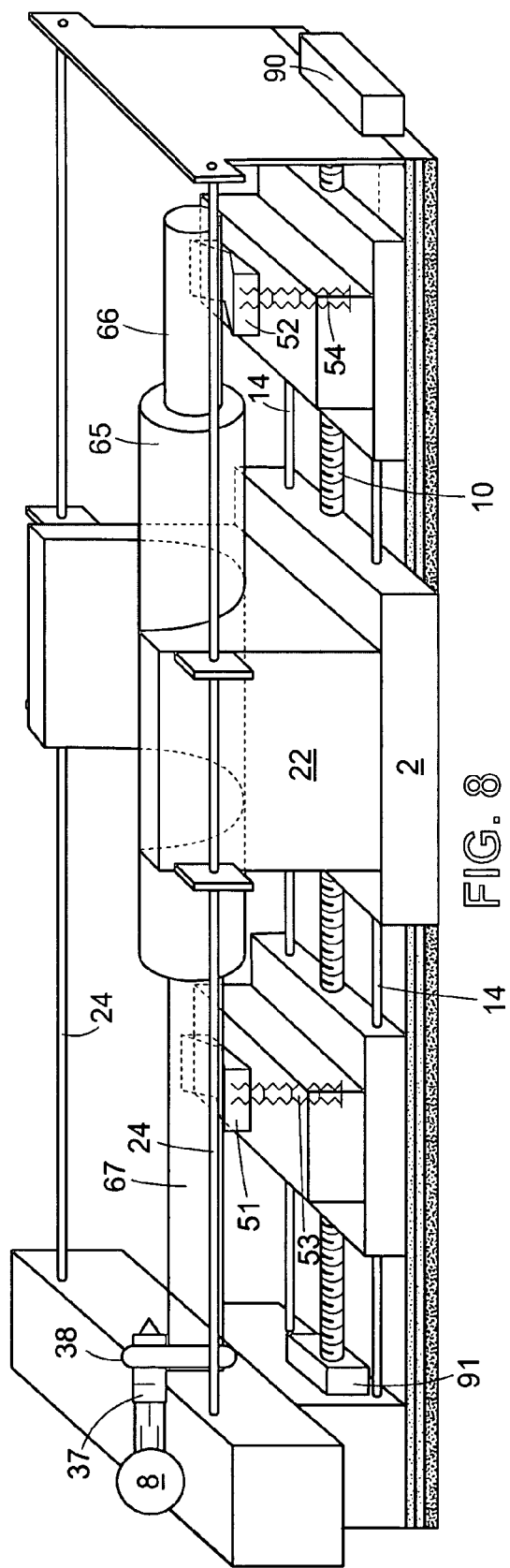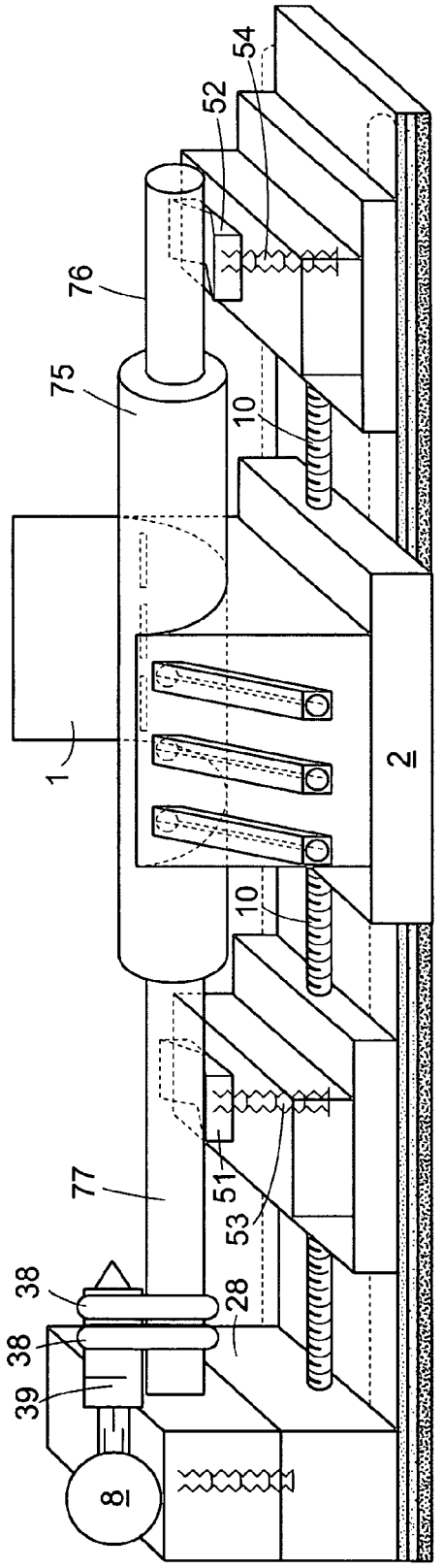

ELECTRICAL DISCHARGE TEXTURING MACHINE

FIELD OF THE INVENTION

The present invention has to do with an apparatus for electrical discharge texturing of the cylindrical working surface of a work roll. More specifically, the invention relates to a low cost electrical discharge texturing machine which can texture work rolls having a broad range of diameters and lengths either on a production or research and development basis.

BACKGROUND OF THE INVENTION

In the manufacture of sheet steel, sheet aluminum and other sheet metal products, paper, plastics and other sheet materials, work rolls or cylinders (referred to hereinafter as "rolls") are employed in the finishing process, for example, in a steel mill, a paper mill or the like. The roll shape and surface are textured to a high degree of accuracy. Traditionally, the roll surface is textured by processes such as shot blasting, electrical discharge texturing (EDT), electron beam texturing, laser texturing and other methods known to those skilled in the art.

Electrical discharge texturing, also referred to as spark elctroerosion or electroblast texturing, is a known process for texturing the working surface of a roll. The process involves the computer controlled spark erosion of the roll surface. The sparks are caused to pass between electrodes and the roll surface through a dielectric fluid. The roll can be partially or completely immersed in the dielectric fluid or the electrode ends can be dammed off and flooded with dielectric fluid and/or the dielectric fluid can be flushed through the electrodes, the fluid exiting at the electrode ends near the roll surface. The electrodes can have a positive polarity or a negative polarity. When the polarity is negative, the spark passes from the electrodes to the roll surface and, when the polarity is positive, the spark passes from the roll surface to the electrodes. Controlled electrical current is generated and discharged through the dielectric fluid producing the ionic charges or sparks that thermally explode into or out of the roll surface. This charge melts the extreme outer layer of the roll, forming microscopic craters proportional in size and spacing to the energy supplied and the frequency of generation. The result is an extremely precise, predictable and controllable texture on the roll surface.

The rolls referred to herein are electrically conductive metal rolls that can be made from various ferrous or non-ferrous materials or combinations of both. In practice, the rolls are predominantly made with steel but they may optionally have an outer shell of copper or nickel. They also may be made from cast iron, tool steels, various alloys, titanium, tungsten carbide, combinations thereof and the like.

Rolls are textured for various reasons for use in steel mills, paper mills and the like. For example, rolls used in steel mills to roll steel sheet that is to be painted cannot be too smooth or the paint adhesion and appearance on the rolled steel sheet will have high variances of quality. Texturing of the rolls provides the rolled steel sheet with a textured surface to which paint adheres and flows better and reduces quality variance. This texturing is conventionally performed by an EDT apparatus wherein a bank of electrodes is moved adjacent the roll surface and/or the roll is moved parallel to the electrode faces as the roll is rotated. EDT machines have electrode positioners each of which moves its associated electrode generally along its central axis toward and away from the roll to control the voltage drop and, accordingly, the electrical ionization process. In some EDT machines the electrodes are positioned about 10° below the center line of the roll on one side and about 10° above the center line on the other side so that they can be thrown out of the way if the roll surface hits them during rotation.

Electrode positioners ensure that each electrode is properly spaced with respect to the roll surface so as to be close enough to generate momentary sparks through dielectric fluid but not too close so as to generate a continuous current flow without any sparks to perform the texturing operation.

EDT machines for commercial applications are large and expensive. In most cases they are also inflexible as to diameters and lengths of rolls that can be textured on a particular machine. It is an object of the present invention to make a smaller, less expensive EDT machine that can be used to texture a broad range of roll diameters and lengths. A further object of the invention is to make an EDT machine that is suitable for use in low volume production or research and development applications while maintaining the ability to texture the roll surface to the same or improved degree of accuracy as the large commercial scale machines.

SUMMARY OF THE INVENTION

The EDT machine of the present invention employs an oil tank-electrode assembly mounted on a carriage. The movement of the carriage can be programmed so that the assembly can be moved horizontally in parallel with the central axis of a work roll to traverse the full length of the roll, or along a portion of the length of the roll and/or back and forth at any pre-selected interval and distance along the length of the roll. Electrodes are mounted on the assembly so that their proximal ends (the ends near the roll surface) are in a higher plane than their distal ends or, at the most extreme setting, the electrodes are horizontal. As noted above, the electrodes also can be positioned so that they are 10° below or 10° above the center line of the roll.

The EDT machine of the invention allows for texturing of long and short rolls and rolls having large and very small diameters. The machine also has adjustable central axis supports for the rolls which can raise or lower a roll relative to the electrodes thereby providing additional flexibility in the roll dimensions that can be textured.

When more than one electrode is used, they are arranged in parallel in rows on the front or rear of the assembly or on the front and rear of the assembly. The front and rear rows can either be lined up or offset from one another.

BRIEF DESCRIPTION OF THE DRAWINGS

FIGS. 2 and 2A are partial top views of two embodiments of FIG. 1.

FIG. 5A is a partial section view taken along section line 5A-5A of FIG. 10.

FIG. 5B is a partial section view taken along section line 5B-5B of FIG. 10.

FIG. 6 is a partial perspective view of an EDT apparatus of the invention.

FIG. 7 is a partial perspective view of another EDT apparatus of the invention.

FIG. 8 is a partial perspective view of still another EDT apparatus of the invention.

FIG. 9 is a partial perspective view of another embodiment of an EDT apparatus of the invention.

DESCRIPTION OF THE PREFERRED EMBODIMENT

Figure 1:
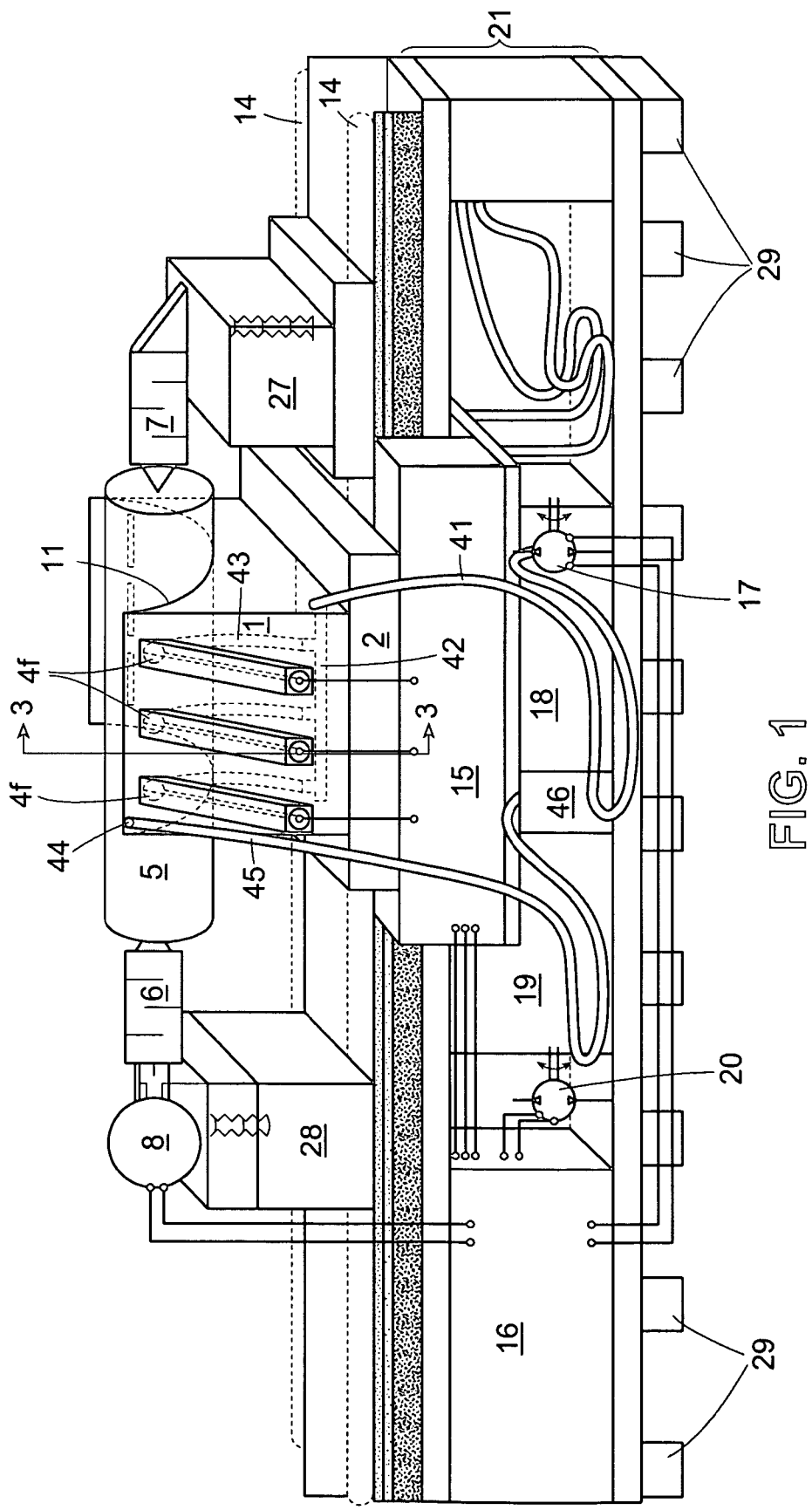
FIG. 1 is a perspective view of an embodiment of the EDT apparatus of the invention.
Figure 3:
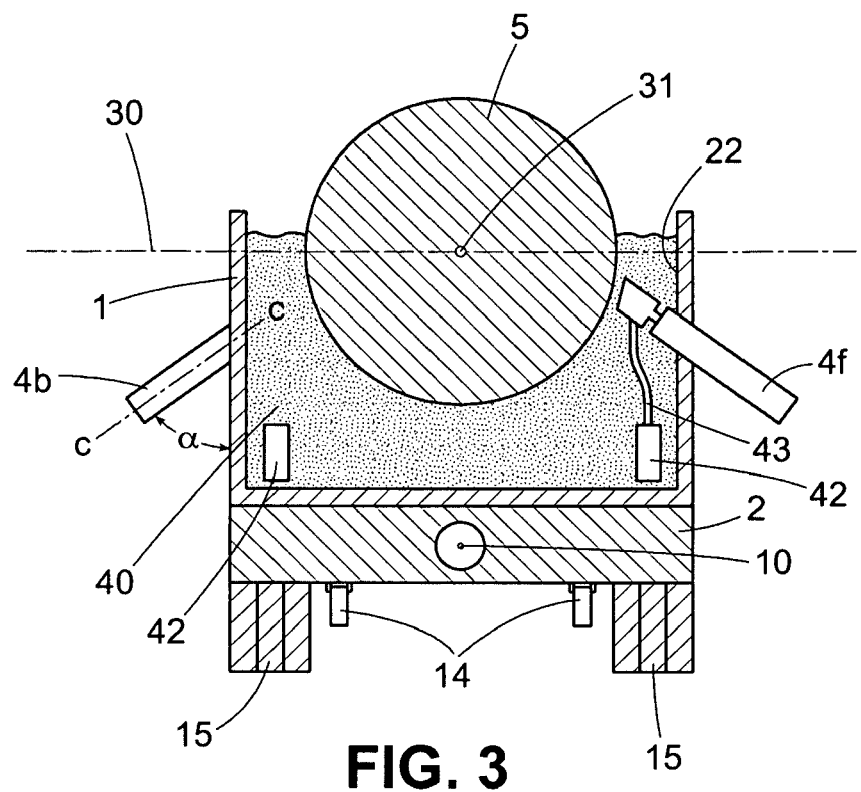
FIG. 3 is a partial section view of FIG. 1 taken along section line 3-3 of FIG. 2.

FIG. 1 is a perspective view of an embodiment of the EDT apparatus of the invention having an oil tank-electrode assembly 1 mounted on a carriage 2. Three electrodes 4f are mounted in a row and in parallel on the front of assembly 1. These can be offset from the three electrodes 4b mounted in a row and in parallel on the back of assembly 1 as illustrated in FIG. 2, a partial top view of FIG. 1, wherein the work tank 22 has not yet been filled with dielectric oil 40 (also referred to herein as "dielectric fluid"). (In FIG. 3, work tank 22 is filled with dielectric oil 40.) FIG. 2A illustrates an embodiment wherein the electrodes are lined up (not offset) front to back. Work roll 5 is suspended at its central axis by rotational supports 6 and 7. Drive motor 8 drives rotational support 6, causing the roll 5 to rotate about its central axis during the EDT process. A dielectric oil tank 18 has sufficient capacity to supply enough dielectric oil to the assembly 1 to fill work tank 22 of the assembly 1 up to a level whereby the ends of electrodes 4f and 4b in close proximity to work roll 5 (the proximal ends of the electrodes) are immersed in the oil as illustrated in FIG. 3. In some embodiments, dielectric oil is flushed through the electrodes toward the roll surface. This causes debris to flow away from the roll. As the roll turns, it drags clean oil around the roll and debris is dragged away from the electrodes and settles to the tank bottom. The central axis 31 of roll 5 lies in a horizontal plane 30 and the tank ends 11 and 12 of assembly 1 are maintained in sealing contact with the cylindrical outer surface of the roll 5 at least up to a level sufficient to prevent the oil from spilling over the ends during operation of the EDT apparatus.

The assembly 1 is moved back and forth along the length of the roll 5 in parallel with the central axis by moving the carriage 2 along a slideway comprised of rails 14. Servo module 15 also moves with the carriage 2. Movement of the carriage 2, rotation of roll 5 and power supply to electrodes 4f and 4b can be controlled by electrical controls 16 employing conventional means well known to those in the art. As the assembly 1 traverses roll 5, the tank ends 11 and 12 maintain their sealing contact with the roll and clean sufficient oil off the roll to prevent or minimize oil loss that might otherwise be caused by dripping of the oil off of the roll. The dielectric oil is continuously circulated by pump 17 through the electrodes and cleaned and recycled. More specifically, the dielectric oil is pumped through flexible feed hose 41 into manifold 42 whereby it is distributed through hoses 43 to each electrode. The oil is discharged from the electrodes at the ends proximate the roll whereby the oil is collected by work tank 22. When the oil level reaches overflow port 44, it is returned through optional flexible return hose 45 to dirty oil tank 46. The oil is cleaned up by conventional means and returned to tank 18. Carriage movement may be caused by a hydraulic system, an electric motor, a magnetic system or other suitable system. When a hydraulic system is used to cause carriage movement, the hydraulic oil can be maintained in hydraulic oil tank 19 and pumped by pump 20. Adjustable supports 27 and 28 can be used to raise or lower the roll to accommodate rolls of different diameters and can be moved laterally along the length of the apparatus to accommodate longer or shorter rolls. The entire EDT apparatus rests on machine support 21 and floor mounts 29.

FIG. 3 is a partial section view of FIG. 1 illustrating the horizontal plane 30, central axis 31 of the work roll and the dielectric oil 40. As noted above, sufficient dielectric oil is filled into the assembly to cover the proximal ends of the electrodes and at least partially immerse the roll in the dielectric oil. The level of the dielectric oil can slightly exceed the height of the horizontal plane as illustrated in FIG. 3 or the level can be at or below the horizontal plane as long as the proximal ends of the electrodes are covered with oil. It should be noted that when rolls having different diameters are employed, tank ends 11 and 12 are modified to insure a seal around a sufficient portion of the roll to prevent dielectric oil leakage.

Also illustrated in FIG. 3 is a portion of drive mechanism 10 which can be a threaded rod, chain drive or other suitable drive means to move the carriage 2 back and forth along the full length of the roll and/or along intermediate distances along the length of the roll. Carriage 2 is guided by rails 14. A servo module 15 is shown for each electrode.

Figure 4:
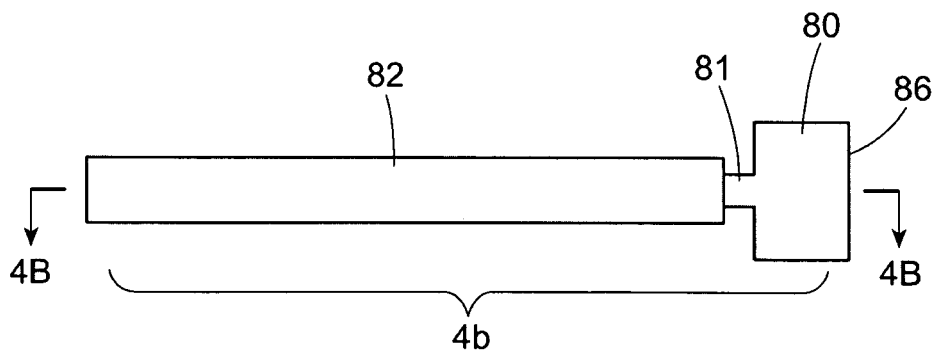
FIG. 4 is a top view of an electrode.
Figure 4A:
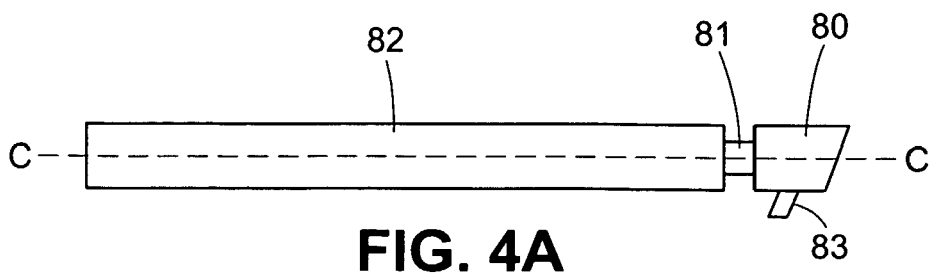
FIG. 4A is a side elevation view of the electrode of FIG. 4.
Figure 4B:
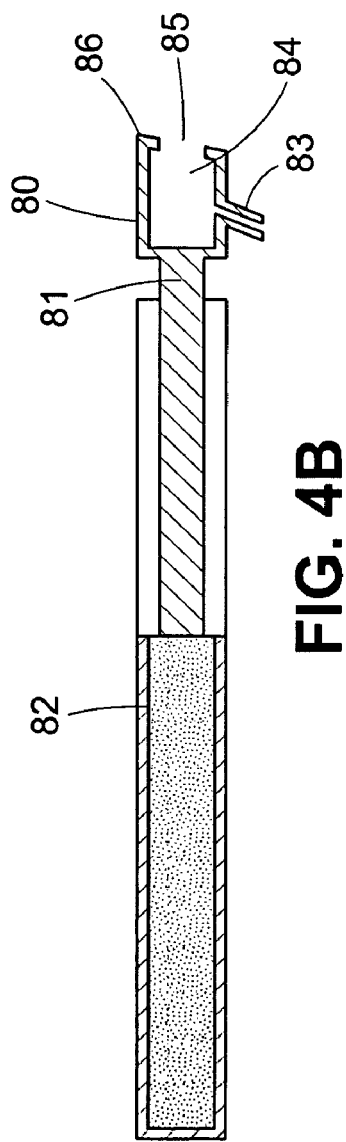
FIG. 4B is a section view of FIG. 4 taken along section line 4B-4B.
Figure 4C:
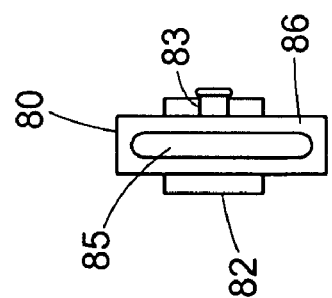
FIG. 4C is an end view of the right end of FIG. 4.

Each electrode has a central axis c-c as illustrated in FIGS. 2, 2A, 3 and 4A in an electrode 4b. FIG. 4 is a top view of an electrode 4b comprised of electrode element 80 mounted on shaft 81 of hydraulic actuator 82. The hydraulic actuator is part of an automatic electrode positioner system which is explained below. Other types of actuators, such as linear DC actuators, are known in the art and can be used with the invention. FIG. 4A is a side elevation view of the electrode of FIG. 4 illustrating tube 83 for connection to a hose 43 (see FIGS. 1 and 3) which optionally supplies dielectric oil to the electrode element 80. A section view FIG. 4B illustrates a dielectric oil cavity 84 in the electrode element 80, the cavity being open to flushing orifice 85 which is also illustrated in FIG. 4C in an end view of the electrode 4b. The electrode elements can be moved along the direction of the central axis c-c toward or away from roll 5. The proximal end 86 of the electrode element 80 (usually comprised of copper) is moved toward or away from the surface of roll 5 by hydraulic cylinder 82. This movement is controlled by servo module 15 which automatically adjusts the distance between the proximal end 86 and the surface of work roll 5 by measuring voltage drop as it varies with changes in the distance. The distance is adjusted automatically in response to the voltage drop until the desired voltage drop is attained. The angle ∝ relative to a vertical plane as illustrated in FIG. 3 in respect of an electrode 4b can optionally be adjusted but it cannot exceed 9° and in most applications it will be less than 90°. The ability to move the electrodes along their c-c axes and adjust the angle ∝ permit further flexibility in texturing rolls having a broad range of diameters.

It should be noted that the invention is not limited to the use of six electrodes as illustrated in the drawings. For example, one electrode can be used or one in the front of the assembly and one in the back, offset from one another or lined up, or three or more can be used provided that when multiple electrodes are used, they are arranged in rows and in parallel on the front or back of the assembly or on the front and back of the assembly and offset or lined up in the manner illustrated in the drawings (FIGS. 2 and 2A) and as described above. Each parallel row of electrodes defines a plane in which lies the center lines c-c of each electrode. The center line of the work roll can lie in the plane or can be in parallel with the plane.

Figure 5:
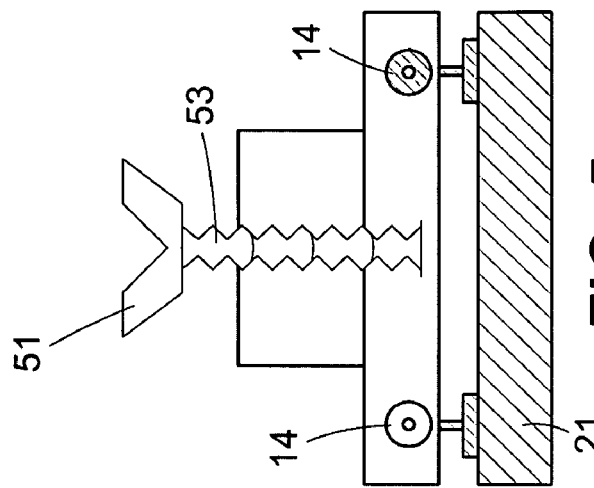
FIG. 5 is a partial section view taken along section line 5-5 of FIG. 10.
Figure 10:
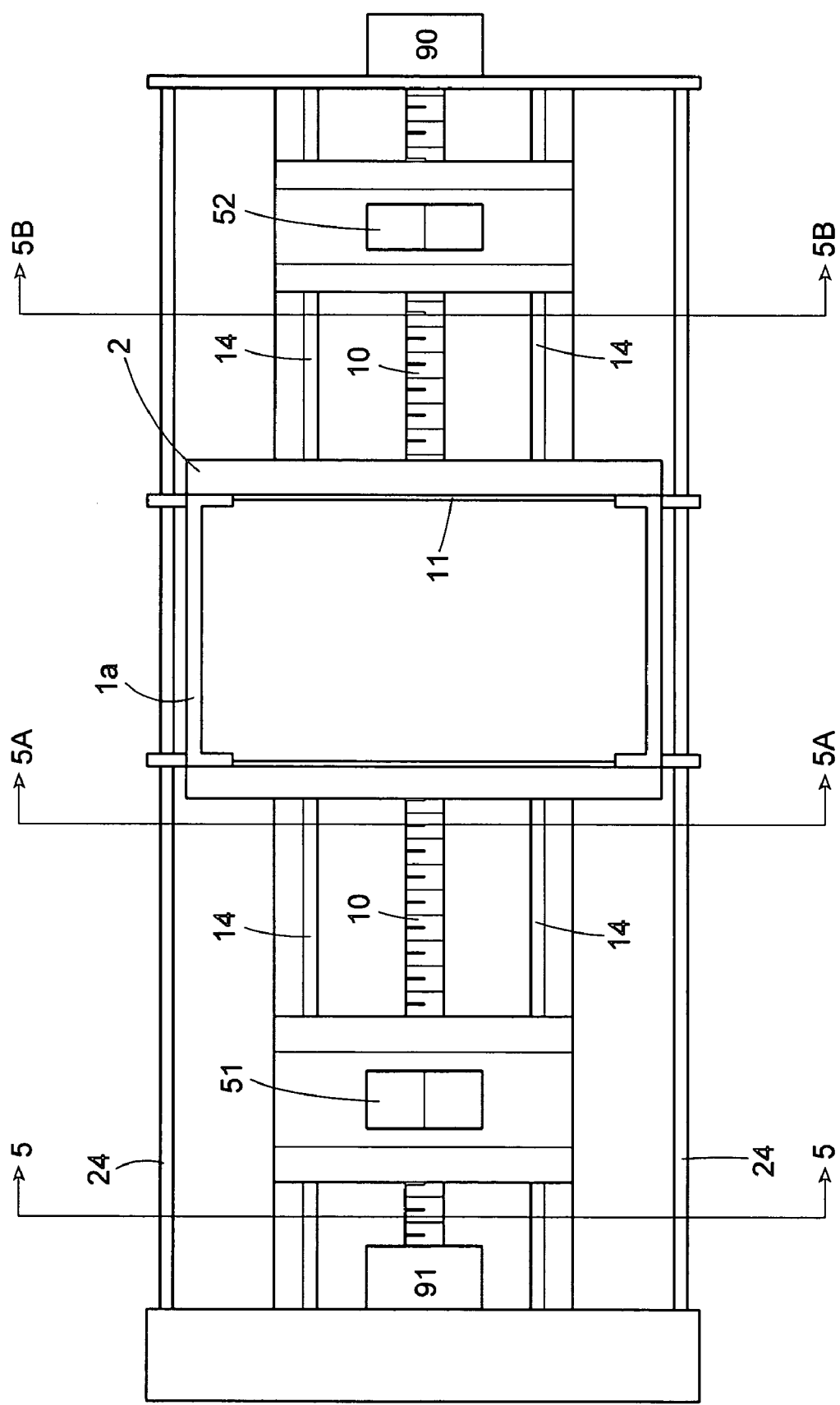
FIG. 10 is a top view of FIG. 8 after the roll 65 and roll drive elements 8, 37 and 38 have been removed.

FIGS. 5, 5A and 5B are partial section views taken at various sections along the length of the machine illustrated in FIGS. 8 and 10 as indicated by the corresponding section lines in FIG. 10. FIG. 5A illustrates an end elevation of the tank 22 (with added electrodes 4b and 4f) mounted on carriage 2. Sections of cylindrical rails 14 and drive mechanism 10 are illustrated as well as sections of optional guide rails 24 and a portion of machine support 21. A guide rail 24 is also illustrated in a partial perspective view 6. The rails can be used to provide added stability to assembly 1.

FIGS. 5 and 5B illustrate roll journal supports 51 and 52, respectively. These are also shown in partial perspective views FIGS. 8 and 9. The height of support 51 is adjusted using support adjuster 53 and the height of support 52 is adjusted using support adjuster 54. The support adjusters can employ various mechanisms including threaded rods, jacks or the like.

FIG. 7 is a partial perspective view of the FIG. 1 EDT apparatus which is configured to texture a small diameter roll 55.

FIG. 8 is a partial perspective view of an EDT apparatus of the invention employing a different roll support and roll drive configuration from the FIG. 1 embodiment. Roll 65 has journals 66 and 67 which rest on journal supports 52 and 51, respectively. Motor 8 drives shaft 37 which in turn drives belt 38 and the roll 65. The apparatus has a threaded x-axis drive 10, cylindrical rails 14 and optional guide rails 24. Tank 22 is mounted on carriage 2. For purposes of drawing clarity, the electrodes and related elements have not been illustrated. Elements 90 and 91 have to do with driving and controlling the drive of x-axis drive 10. For example, element 90 can be a drive motor and clutch and element 91 can be a controller. The movement of carriage 2 and, accordingly, tank 22 (the oil tank-electrode assembly 1 when electrodes are included), can be controlled in various ways. For example, carriage 2 can simply be caused to traverse the entire length of the work surface of a roll in back and forth motions. Stepwise traversal can also be programmed into the controller, for example, moving a preselected distance and stopping for a preselected time and then moving the same or different preselected distance and stopping for the same or different preselected time or moving back and forth the same or different distances over the same or different interval of time. Accordingly, the frequency, distance and speed can be controlled and the movement can be continuous, reversing and/or stepping. Thus, a programmable controller used in combination with a linear drive as illustrated can be used to selectively treat the surface of a roll. This provides flexibility in the texturing and treatment of roll surfaces that heretofore has been unattainable. For example, with an EDT apparatus of the invention, one can now effectively treat historically bad areas of a roll surface in a different manner from areas that have not been problematic.

In FIG. 9, heavy roll 75 has journals 76 and 77 which rest on journal supports 52 and 51, respectively. Motor 8 drives heavy duty shaft 39 which in turn drive two belts 38 and the roll 75. It should be noted that motor 8 in the FIG. 9 embodiment is mounted on adjustable support 28 whereas the motor 8 in FIG. 8 is not mounted on an adjustable support.

FIG. 10 is a top view of FIG. 8 except that roll 65 and roll drive elements 8, 37 and 38 were removed for drawing clarity. The x-axis drive 10 is illustrated as a threaded rod.

Figure 11:
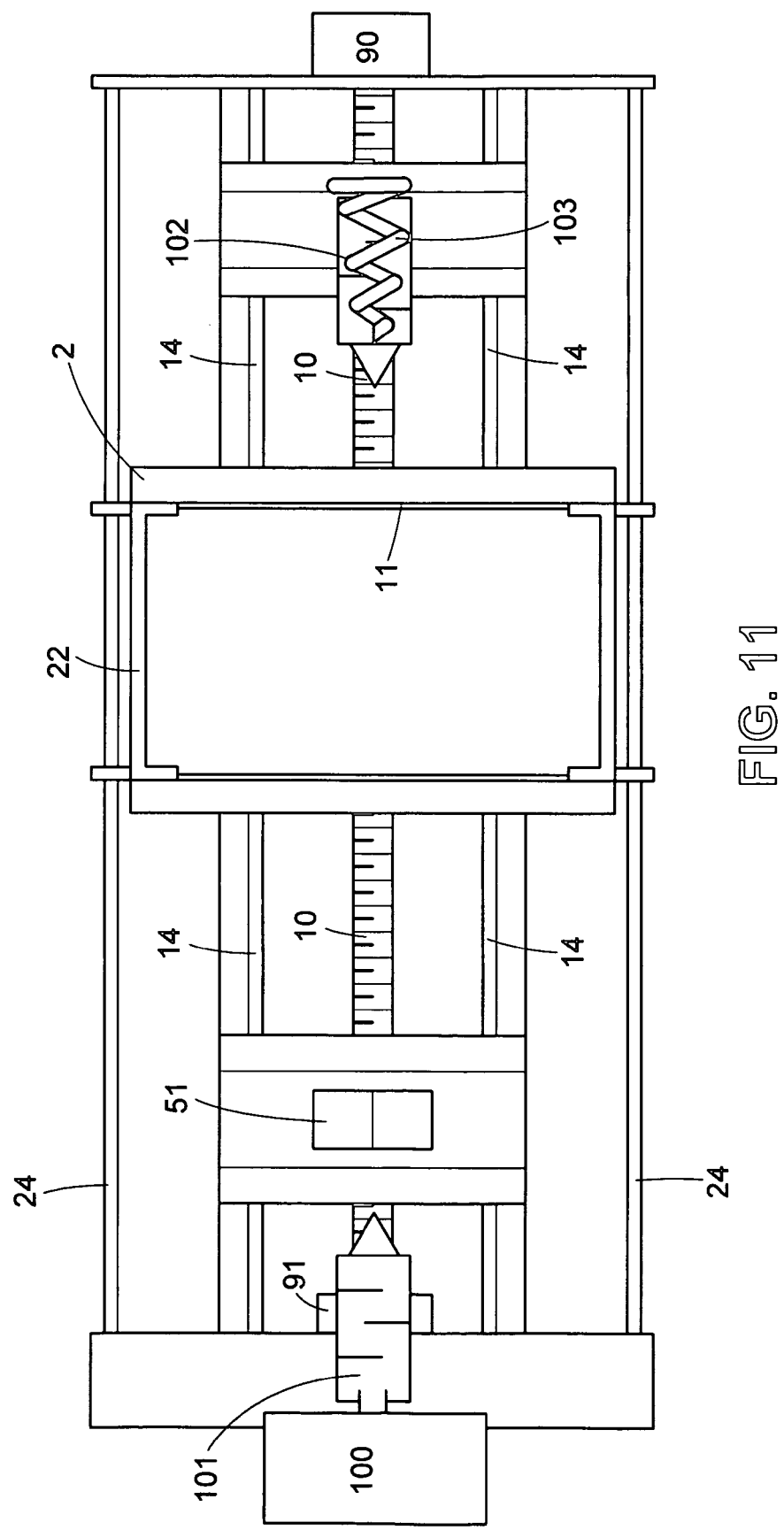
FIG. 11 is a top view of FIG. 10 with the addition of mechanisms for oscillating a roll along its center line.

A top view of another embodiment of the invention is illustrated in FIG. 11. This is the same as the FIG. 10 embodiment but with the addition of programmable cam drive 100 and rotational supports 101 and 102. Cam drive 100 can cause a roll to rotate either clockwise or counterclockwise continuously, stepwise and/or reversing. It can also cause the roll to oscillate back and forth along its central axis and this is facilitated by spring 103 in rotational support 102. The frequency and amplitude of the oscillations can be controlled and they can be continuous, intermittent, increasing and/or decreasing. The features provided by elements 100, 101, 102 and 103 can be used in combination with the programmable movement of the carriage 2 described above in respect of FIG. 8 in addition to other features of the invention described herein to attain additional and heretofore unattainable flexibility in the texturing and treatment of roll surfaces.

What is claimed is:

1. Apparatus for electrical discharge texturing of a cylindrical surface of a work roll, comprising:
   a slideway that extends parallel to a central axis of the roll;
   a rotational support for rotatably supporting and rotating the roll about the central axis of the roll and for raising or lowering the central axis of the roll relative to the slideway;
   a carriage supported for movement along the slideway;
   an oil tank-electrode assembly mounted on the carriage, comprising an oil tank sealingly engaged with a sufficient portion of the cylindrical surface of the roll to prevent oil leakage and filled with a dielectric oil to a level below, at or above a first horizontal plane which passes through the central axis, the roll being at least partially immersed in the dielectric oil, and one or more than one electrode affixed to the oil tank, each electrode having a center line and having a proximal end disposed below the level of the dielectric oil and in close proximity to the cylindrical surface and a distal end extending outside the tank, the center line being disposed in a second horizontal plane which is the same as or below the first horizontal plane or the center line at the proximal end being disposed in the first or second horizontal plane when the center line at the distal end is disposed below said first or second horizontal plane.

2. The apparatus of claim 1 wherein the oil tank-electrode assembly has a front portion and a rear portion and at least one front electrode affixed to the front portion, the front electrode having its proximal end in close proximity to a portion of the cylindrical surface.

3. The apparatus of claim 2 further comprising at least one rear electrode affixed to the rear portion, the rear electrode having its proximal end in close proximity to a portion of the cylindrical surface.

4. The apparatus of claim 3 wherein the front electrode and the rear electrode are lined up longitudinally in respect of their central axes.

5. The apparatus of claim 3 wherein the front electrode and the rear electrode are offset longitudinally in respect of their central axes.

6. The apparatus of claim 2 wherein there are multiple front electrodes and multiple rear electrodes.

7. The apparatus of claim 6 wherein the front electrodes are arranged in parallel in a row and the rear electrodes are arranged in parallel in a row.

8. The apparatus of claim 1 wherein the proximal end of each electrode is perpendicular to the cylindrical surface.

9. The apparatus of claim 1 wherein the proximal end of each electrode is not perpendicular to the cylindrical surface.

10. The apparatus of claim 1 further including a working oil tank for supplying oil to the oil tank-electrode assembly or receiving oil from the oil tank-electrode assembly.

11. The apparatus of claim 10 wherein the working oil tank is an integral part of a base of said apparatus.

12. The apparatus of claim 1 wherein the carriage is programmably moveable along the slideway continuously, stepwise, back and forth and/or intermittently at the same or various intervals, frequencies and/or distances.

13. The apparatus of claim 12 wherein the work roll is programmably rotatable about its central axis, continuously, stepwise, back and forth and/or intermittently at the same or various intervals, frequencies and/or distances.

14. The apparatus of claim 13 wherein the work roll is programmably movable along its central axis continuously, stepwise, back and forth and/or intermittently at the same or various intervals, frequencies and/or distances.

15. Apparatus for electrical discharge texturing of a cylindrical surface of a work roll, comprising:

a slideway that extends parallel to a central axis of the roll;

a rotational support for rotatably supporting and rotating the roll about the central axis of the roll;

a carriage supported for movement along the slideway;

an oil tank-electrode assembly mounted on the carriage, comprising an oil tank sealingly engaged with a sufficient portion of the cylindrical surface of the roll to prevent oil leakage and filled with a dielectric oil to a level below, at or above a first horizontal plane which passes through the central axis, and one or more than one electrode affixed to the oil tank;

the carriage being programmably moveable along the slideway continuously, stepwise, back and forth and/or intermittently at the same or various intervals, frequencies and/or distances;

the work roll being programmably rotatable about its central axis, continuously, stepwise, back and forth and/or intermittently at the same or various intervals, frequencies and/or distances; and the work roll being programmably movable along its central axis continuously, stepwise, back and forth and/or intermittently at the same or various intervals, frequencies and/or distances.

* * * * *